United States Patent [19]

Blount et al.

[11] Patent Number: 4,627,017
[45] Date of Patent: Dec. 2, 1986

[54] ADDRESS RANGE DETERMINATION

[75] Inventors: Frederick T. Blount, Hopewell Junction; Arnold Weinberger, Poughkeepsie, both of N.Y.

[73] Assignee: International Business Machines Corporation, Armonk, N.Y.

[21] Appl. No.: 490,764

[22] Filed: May 2, 1983

Related U.S. Application Data

[63] Continuation of Ser. No. 199,143, Oct. 22, 1980, abandoned.

[51] Int. Cl.⁴ .............................................. G06F 12/00
[52] U.S. Cl. .................................................. 364/900
[58] Field of Search ... 364/200 MS File, 900 MS File; 365/230

[56] References Cited

U.S. PATENT DOCUMENTS

| | | | |
|---|---|---|---|
| 3,264,615 | 8/1966 | Case et al. | 364/200 |
| 3,328,768 | 6/1967 | Andahl et al. | 364/200 |
| 3,742,458 | 6/1973 | Inoue et al. | 364/200 |
| 3,931,611 | 1/1976 | Grant et al. | 364/200 |
| 3,999,052 | 12/1976 | Gooding et al. | 364/200 X |

Primary Examiner—Eddie P. Chan
Attorney, Agent, or Firm—James E. Murray

[57] ABSTRACT

An (M plus K)-digit accessed address is checked to see if it may fall within a range of addresses g defined by the address at one end of the range plus a variable range of addresses (g). The checking is done in a single step in a comparison of the K lowest order address digits for both addresses. The K digits of the two addresses are checked against one another in two separate segments, a pointer segment and a range segment. The pointer segments of the two addresses are examined to see if any one of three relationships which would possibly place the accessed address within the range exists. The range segments of the two addresses are examined at the same time for an additional requirement to place the accessed address in the range.

4 Claims, 3 Drawing Figures

FIG. 1

$$\left(\begin{array}{c}ODR\\ICR\end{array}\right)_{17} \left(\begin{array}{c}ODR\\ICR\end{array}\right)_{18} \text{---} \left(\begin{array}{c}ODR\\ICR\end{array}\right)_{26} \left[\begin{array}{c}ODR_{27-28}, ICR_{27-28},\\CO-1 (= \text{RANGE SIZE})\end{array}\right]$$

CASE 1: OVERFLOW CASE

$$\left.\begin{array}{l}ODR_{17-26} = \emptyset \cdots \emptyset \\ ICR_{17-26} = 1 \cdots 1\end{array}\right\}$$

$(ODR_{17-26}\ MINUS\ ICR_{17-26}) \leq 0$ $(ODR_{17-26}\ MINUS\ ICR_{17-26})\ MODULO\ 2^{12} = +4$ $$(L_{17} \quad L_{18} \text{ --- } L_{26}) \cdot \left[(ODR_{27-28})\ MINUS\ \left(\begin{array}{c}ICR_{27-28}\\ PLUS\\ RANGE\ SIZE\end{array}\right)\right] \leftarrow -4$$

$(\ell) \cdot [A]$

CASE 2: $(ODR_{17-26}\ MINUS\ ICR_{17-26} = +4)$ $$\begin{array}{l}G_{17} \\ OR\ E_{17}\end{array}\Bigg\} \begin{array}{ccc}G_{18} & \text{---} & G_{26} \\ \text{---} & \text{---} & \text{---}\end{array} \cdot \{m\} \cdot [A]$$

CASE 3: $(ODR_{17-26} = ICR_{17-26})$ $$(E_{17}\quad E_{18} \text{ --- } E_{26}) \cdot \left[(ICR_{27-28}) \leq (ODR_{27-28}) < \left(\begin{array}{c}ICR_{27-28}\\ PLUS\\ RANGE\ SIZE\end{array}\right)\right]$$

$(n) \cdot [B]$

FIG. 2

| SUB-TABLE | RANGE SIZE | (WEIGHT) | G27(+2) G28E28 (+1) | G27(+2) L28 (-1) | E27(0) G28E28 (+1) | E27(0) (0) | E27(0) L28 (-1) | L27(-2) G28E28 (+1) | L27(-2) (0) | L27(-2) L28 (-1) | ODR27,ICR27 (WEIGHT) ODR28,ICR28 (WEIGHT) |
|---|---|---|---|---|---|---|---|---|---|---|---|
| 1 | 1 | (-1) | +2 | +1 | 0 | -1 | -2 | -3 | -4 | | VALUE OF: (ODR27-28) MINUS (ICR27-28 PLUS RANGE SIZE) |
| 1 | 2 | (-2) | +1 | 0 | -1 | -2 | -3 | -4 | -5 | |  |
| 1 | 3 | (-3) | 0 | -1 | -2 | -3 | -4 | -5 | -6 | |  |
| 1 | 4 | (-4) | -1 | -2 | -3 | -4 | -5 | -6 | -7 | |  |
| 2 | 1 | (-1) | | | | | | | -5 | | $A = [(ODR27-28) \text{ MINUS } (ICR27-28 \text{ PLUS RANGE SIZE}) \leq -4]$ |
| 2 | 2 | (-2) | | | | | -5 | -5 | -6 | | $= (L27 \cdot L28) \cdot (\text{RANGE SIZE} \geq 2)$ |
| 2 | 3 | (-3) | | | | | -5 | -6 | -7 | | $+ (\downarrow \cdot EL28) \cdot (\text{RANGE SIZE} \geq 3)$ |
| 2 | 4 | (-4) | | | | | -5 | -6 | -7 | | $+ (\downarrow \downarrow EL27 \cdot L28) \cdot (\text{ } = -4)$ |
| 3 | 1 | (-1) | +3 | +2 | +1 | 0 | -1 | -2 | -3 | | VALUE OF: |
| 3 | 2 | (-2) | +3 | +2 | +1 | 0 | -1 | -2 | -3 | | (ODR27-28) MINUS (ICR 27-28) |
| 3 | 3 | (-3) | +3 | +2 | +1 | 0 | -1 | -2 | -3 | |  |
| 3 | 4 | (-4) | +3 | +2 | +1 | 0 | -1 | -2 | -3 | |  |
| 4 | 1 | (-1) | +3 | +2 | +1 | +1 | -1 | -1 | -1 | | $B1 = [0 \leq (ODR27-28) \text{ MINUS } (ICR 27-28)]$ |
| 4 | 2 | (-2) | +3 | +2 | +1 | +1 | -1 | -1 | -1 | |  |
| 4 | 3 | (-3) | +3 | +2 | +1 | +1 | -1 | -1 | -1 | |  |
| 4 | 4 | (-4) | +3 | +2 | +1 | +1 | -1 | -1 | -1 | |  |
| 5 | 1 | (-1) | | | -1 | -1 | -2 | -2 | -4 | | $B2 = [(ODR27-28) \text{ MINUS} (ICR27-28 \text{ PLUS RANGE SIZE}) \leq 0]$ |
| 5 | 2 | (-2) | | | -1 | -2 | -3 | -3 | -5 | | B1·B2 REPRESENTED AS B1/B2 IN THE SUBTABLE |
| 5 | 3 | (-3) | | | -2 | -3 | -4 | -4 | -6 | |  |
| 5 | 4 | (-4) | -1 | -2 | -3 | -4 | -5 | -5 | -7 | |  |
| 6 | 1 | (-1) | | | | 0/-1 | | | | | $B = [(ICR27-28) \leq (ODR27-28) < (ICR27-28 \text{ PLUS RANGE SIZE})]$ |
| 6 | 2 | (-2) | +1/-1 | +1/-2 | +1/-1 | +1/-2 | | | | | $= (G27) \cdot (\text{RANGE SIZE} = 4)$ |
| 6 | 3 | (-3) | +2/-1 | +1/-2 | +1/-2 | +1/-3 | | | | | $+ (\downarrow \cdot EL28) \cdot ( \quad \geq 3)$ |
| 6 | 4 | (-4) | +3/-1 | +2/-2 | +1/-3 | +1/-3 | 0/-4 | | | | $+ \left( \downarrow \cdot L28 + E27 \cdot EG28 \right) \cdot ( \quad \geq 2)$ |
|   |   |   |   |   |   |   |   |   |   |   | $+ (E27 \cdot E28)$ |

NOTE: (A,B) ARE MUTUALLY EXCLUSIVE, i.e., $A \cdot B = 0$

FIG. 2

ADDRESS RANGE DETERMINATION

This is a continuation of application Ser. No. 199,143 filed Oct. 22, 1980, now abandoned.

BACKGROUND OF THE INVENTION

The present invention relates to address checking in memories and more particularly to the checking of addresses to see if they fall within a given range.

In many computer operations, it is desirable to check to see if a memory address is within a specified range of such addresses. For instance, an instruction unit for certain computer systems contains an instruction buffer or I buffer that stores consecutively addressed double words fetched from a memory. When a store instruction is performed in the memory, the memory address of the store instruction must be compared to the memory addresses of the double words stored in the instruction buffer to determine if it is any of those double words that are being changed by the store operation. If it is, the buffer will be purged and all double words stored in the buffer will have to be refetched from the memory into the buffer after the store instruction has been performed. The problem with performing this comparison is that a comparison of all M plus K bits in the memory address requires expensive apparatus and incurs extensive circuit delay. On the other hand, checking only a limited number of K lower order bits of the address results in some unnecessary purging of the buffer when a check of the K lower order bits indicates a match that would be precluded if the M higher order bits were checked. In the past, the expense and circuit delay of checking a large number of bits forced the use of a relatively few number of K low order bits with the result that a significant amount of time was wasted by unnecessary purges.

Most of these schemes were involved in the performing of simultaneous selection of 2 or 3 relationships, established in a prior step, to determine if the incoming addresses were within a given range. For instance, one scheme involved checking the incoming address (ODR) with an address ICR to determine if the address ODR was inside the range of addresses spanning the address ICR through ICR plus 3 in accordance with the following formula, in which a fixed range of 4 is assumed.

INSIDE=[ICR≦ODR<(ICR plus 4)]+CARRY OUT of the incrementer for (ICR plus 4) where "+" means a logical "OR" and the word plus means an arithmetic addition. This involved performing an incrementing function (ICR plus 4) and two separate comparisons which are ANDed and then ORed to the CARRY OUT of the incrementor when there is a CARRY OUT.

Similarly, U.S. Pat. No. 3,931,611 describes a scheme using a plurality of adders each to perform a different function in determining if a range of addresses falls within a selected range.

In addition, U.S. Pat. No. 3,264,615 teaches comparing higher order address bits of a block of addresses with the corresponding bits of an address being accessed to determine if the address being accessed is in or outside of the block of addresses.

Also, U.S. Pat. No. 3,983,382 shows that in an adder of two multi-bit numbers, A and B, the condition of the sum being equal to zero can be detected by ORing the relevant product terms of bit-wise functions of the two numbers, the bit-wise functions being $A_iB_i$, $A_i\vee B_i$, and $A_i\bar{B}_i$. The OR of such product terms can be condensed into a simplified single logic equation of such bit-wise functions.

BRIEF DESCRIPTION OF THE INVENTION

In accordance with the present invention, the amount of circuits needed to perform address comparisons of fixed size addresses M+K is reduced, where M are the high-order unchecked bits and K the low-order checked bits. The reduction permits the checking of more bits in the address (K is larger and M correspondingly smaller) without significantly increasing the circuitry count. This is accomplished by further dividing the K low ordered checked bits of both the accessed address and the address of one of the limits of the range into two segments, a high order pointer segment (K-g) and a low order range segment g where g bits are needed to express the range. The pointer segments of the two addresses are examined for three mutually exclusive relationships that would possibly place the accessed address in the range. The range segments are simultaneously compared taking into account the number of addresses in the range for an additional requirement for an accesssed address to be in the range. The three relationships of the pointer segments and the additional requirement of the range segments are combined into a single simple logic equation that sets forth the requirements for an accessed address to be within the range with greater accuracy than by examination of the requirements of the pointer segments by themselves.

Therefore, it is an object of the present invention to provide a new apparatus for checking an address with a range of addresses to determine if the address falls within the range.

It is therefore another object of the invention to provide simplified apparatus to check an address with a range of addresses to determine if the address falls within the range.

BRIEF DESCRIPTION OF THE DRAWINGS

These and other objects of the invention can best be understood by reference to the accompanying figures of which:

FIG. 1 is a chart of various conditions in which the incoming address falls within the range.

FIG. 2 is a chart indicating various values for formulas set forth in the present invention.

DETAILED DESCRIPTION OF THE INVENTION

Figure 3:
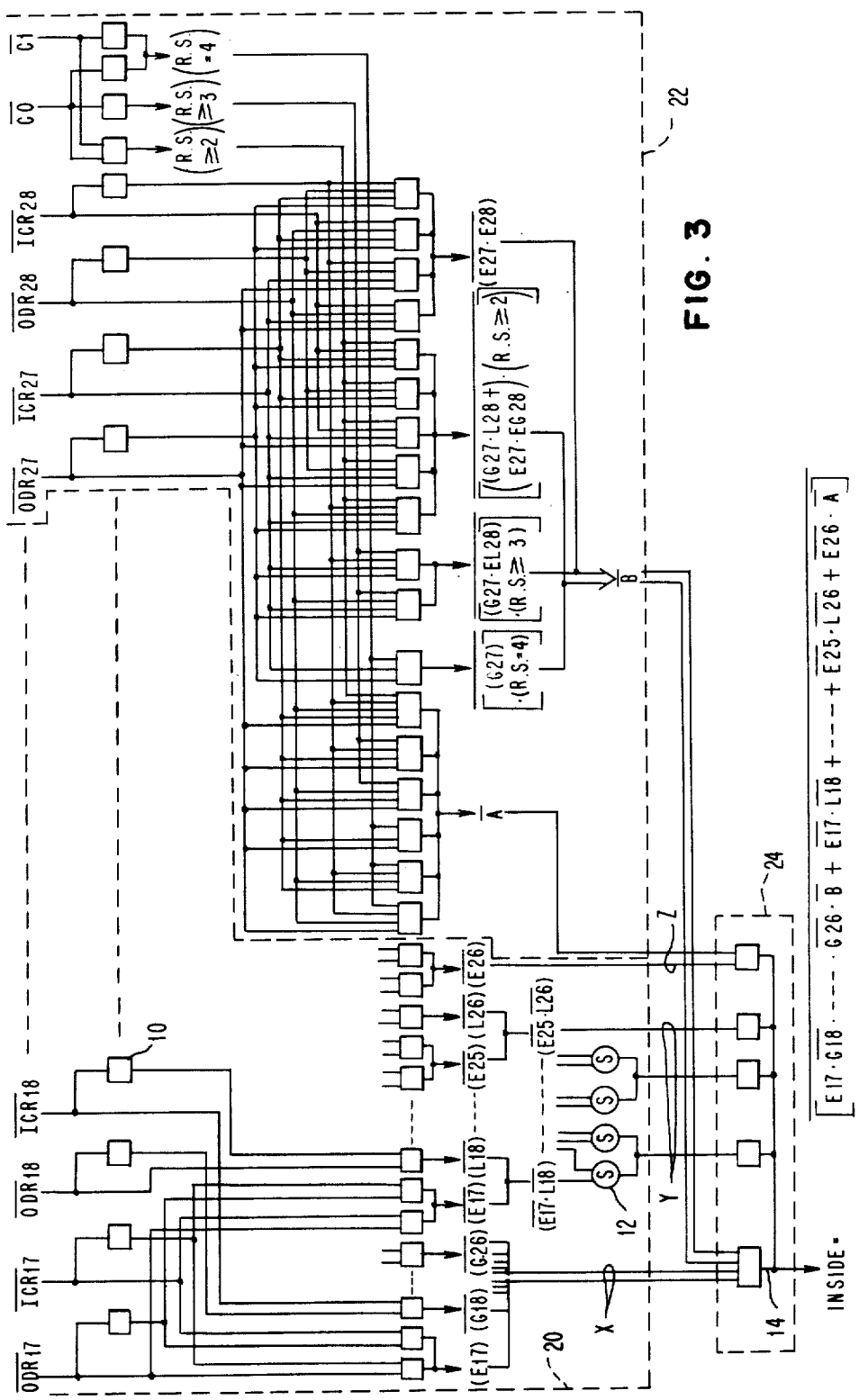
FIG. 3 is a diagram of apparatus for performing the comparison to determine whether an accessed address is within a particular range of addresses.

In a practical application of the present invention to a system employing 28 address bits, the 12 lowest order bits of the two addresses ODR and ICR are examined to determine if ODR falls within the range where the address ICR would be the first address in the range and the last address in the range would be ICR plus 3. Thus,

| | |
|---|---|
| $(ODR_{17}, \ldots, ODR_{26}, ODR_{27}, ODR_{28}) =$ | K low order digits of the incoming address |
| $(ICR_{17}, \ldots, ICR_{26}, ICR_{27}, ICR_{28}) =$ | K low order digits of the numerically lowest address of the range |
| $(2^{11}, \ldots, 2^2, 2^1, 2^0) =$ | weight of bit |

-continued $$(C_0, C_1) = (0,0), (0,1), (1,0), (1,1) =$$
$$= 1, \quad 2, \quad 3, \quad 4$$

position of ODR and ICR.
range size
1 through 4

The incoming address can be considered to be inside the range (INSIDE) when the range size >
$[(ODR_{17-28} - ICR_{17-28})$ modulo $2^{12}]$. (1)

In other words, INSIDE is true (logically 1) if the range size C is greater than the binary value obtained when the 12-bit number $ICR_{17-28}$ is subtracted from the 12-bit number $ODR_{17-28}$ and the result is taken modulo $2^{12}$. The modulo $2^{12}$ is due to the wrap around character of the addresses; namely, the next higher address after address $2^{12}-1$ (i.e. 1111 1111 1111) is 0 (i.e., 0000 0000 0000). For example, if C is 4, ODR is 2, and ICR is $2^{12}-1$, then the value ODR less ICR is $3-2^{12}$, which becomes 3 when taken modulo $2^{12}$. Therefore, $4>3$, so that INSIDE is true. Even though only the $K(=12)$ lower order digits of the M plus K digits of the address are used for comparison, the use of modulo $2^K$ is still valid because the comparison assumes the higher order M bits of ODR and ICR match. One binary digit, e.g. $ODR_i$, can be compared with another binary digit of the same weight or bit position, e.g. $ICR_i$, for being:

$G_i$, (greater than), i.e. $[ODR_i>ICR_i]$
$L_i$, (less than), i.e., $[ODR_i<IDC_i]$
$E_i$, (equal to), i.e. $[ODR_i=ICR_i]$
$G_i$ or $[ODR_i>ICR_i]$ is true if $ODR_i$ is logically 1 and $ICR_i$ is logically 0, i.e. $ODR_i \cdot \overline{ICR_i}$
$L_i$ or $[ODR_i>ICR_i]$ is true if $ODR_i$ is logically 0 and $ICR_i$ is logically 1, i.e., $\overline{ODR_i} \cdot ICR_i$
$E_i$ or $[ODR_i=ICR_i]$ is true if $ODR_i$ and $ICR_i$ are both 0 or both 1, i.e., $\overline{ODR_i} \cdot \overline{ICR_i} + ODR_i \cdot ICR_i$
$G_i$, $L_i$, $E_i$ are mutually exclusive with one and only one being true.

From these compare functions, other compare functions can be derived.

$EG_i=[ODR_i \geq ICR_i]=$[equal to or greater] is true if $[ODR_i<ICR_i]$ is untrue, i.e., $\overline{ODR_i \cdot ICR_i}=ODR_i+ICR_i=E_i+G_i$ $EL_i=[ODR_i \leq ICR_i]=$[equal to or less] is true if $[ODR_i>ICR_i]$ is untrue, i.e. $\overline{ODR_i \cdot ICR_i}=ODR_i+ICR_i=E_i+L_i$ Therefore below are all possible relationships between any order incoming address bit $ODR_i$ and the corresponding order address bit $ICR_i$ of the numerically lowest address of the range along with a Boolean definition of each of the relationships.

$$G_i = [ODR_i > ICR_i] = ODR_i \cdot \overline{ICR_i} \quad (2)$$

$$E_i = [ODR_i = ICR_i] = \overline{ODR_i \mathbin{\underline{\vee}} ICR_i}$$

$$= \overline{ODR_i} \cdot \overline{ICR_i}$$

$$+ ODR_i \cdot ICR_i \quad \text{for bit } i$$

$$L_i = [ODR_i < ICR_i] = \overline{ODR_i} \cdot ICR_i$$

$$EG_i = [ODR_i \geq ICR_i] = ODR_i + \overline{ICR_i}$$

$$EL_i = [ODR_i \leq ICR_i] = \overline{ODR_i} + ICR_i$$

In converting the inequality (1) into a hardware logic equation using the Boolean terms set forth in (2), all possible situations or cases where the ODR would fall within the range have to be considered. As shown in FIG. 1, one of the situations hereinafter referred to as case 1, an overflow condition exists. That is, the situation where the lowest address ICR plus the range size exceeds the highest address in the memory system used for comparison, $2^K-1$ where K is 12 in this embodiment so that the range wraps around and encompasses addresses at both the top and bottom of the compared address range. In case 1, all of the ODR positions 17 through 26 are 0's while all of the ICR positions 17 through 26 are 1's. This situation can be checked by performing the $L_i$ function set forth above for each of the bit positions 17 through 26. In addition, the two lowest order digits 27 and 28 have to be checked to determine if $ODR_{27-28}$ minus $(ICR_{27-28}$ plus the range size) is less than $-4$. For example, if $C=3$, $ODR_{17-28}=1$ (i.e., 0000 0000 0001), and $ICR_{17-28}=2^{12}-1$ (i.e., 1111 1111 1111), then $L_i=1$ (i.e., $ODR_i<ICR_i$) for $i=17$-26, and $[ODR_{27-28}$ minus $(ICR_{27-28}$ plus $C)]=[1$ minus $(3$ plus $3)]>-4$.

Case 2 of FIG. 1 covers another situation where the accessing address falls with the address range. This situation is where one of the $ODR_i$ bits 17 to 26 is a 1 while the corresponding $ICR_i$ bit is a 0 with all higher order bit positions containing matching digits while $ODR_i=0$ and $ICR_i=1$ in lower order bit positions. In case 2, the relationship between $ODR_{27-28}$, $ICR_{27-28}$ and the range size is the same as in case 1. For example, if $C=3$, $ODR_{17-28}=0000\,0001\,0001$, and $ICR=0000\,0000\,1111$, then $E_i=1$ (i.e., $ODR_i=ICR_i$) for $i17$-23, $G_{24}=1$ (i.e. $ODR_{24}>ICR_{24}$), $L_i=1$ (i.e., $ODR_i<ICR_i$) for $i=25$-26, and $[ODR_{27-28}$ minus $(ICR_{27-28}$ plus 3)$]=[1$ minus $(3+3)]>-4$.

The third condition (case 3) where the accessing address is within the range is when $ODR_i=ICR_i$ in all bit positions 17 to 26 and in the last two bit positions ODR is equal to or greater than ICR and also less than ICR plus the range size. For example, if $C=3$, $ODR_{17-28}=0000\,0000\,0011$, and $ICR=0000\,0000\,0001$, then $E_i=1$ for $i=17$-26, $ODR_{27-28} \geq ICR_{27-28}$ (i.e., $3>,1$), and $ODR_{27-28}<[ICR_{27-28}$ plus C] (i.e., $3<[1$ plus 3]). Cases 1 to 3 are outlined in FIG. 1 in table form with the Boolean expressions for each case set forth. If the three Boolean expressions in FIG. 1 are ORed, you get a formula for all possible conditions in which the incoming address ODR could fall within the range with the lowest address of ICR. Therefore:

$$
\begin{aligned}
\text{INSIDE} &= L_{17} \cdot L_{18} \cdot \ldots \cdot L_{26} \cdot A \\
&+ G_{17} \cdot \downarrow \, \ldots \, \downarrow \cdot \downarrow \\
&+ E_{17} \cdot G_{18} \cdot \ldots \, \downarrow \cdot \downarrow \\
&\quad . \\
&+ \downarrow \cdot E_{18} \cdot \ldots \cdot G_{26} \cdot \downarrow \\
&+ \downarrow \cdot \downarrow \cdot \ldots \cdot E_{26} \cdot B \\[4pt]
&= \overline{E_{17}} \cdot L_{18} \cdot \ldots \cdot L_{26} \cdot A \\
&+ E_{17} \cdot G_{18} \cdot \ldots \, \downarrow \cdot \downarrow \\
&\quad . \\
&+ \downarrow \cdot E_{18} \cdot \ldots \cdot G_{26} \cdot \downarrow \\
&+ \downarrow \cdot \downarrow \cdot \ldots \cdot E_{26} \cdot B \\
\end{aligned}
$$

The first and second terms of this equation which appears in the first and second lines of the equation respectively can be combined into one term $(\overline{E_{17}} \cdot L_{18} \cdot \ldots \cdot L_{26} \cdot A)$ because $\overline{E_{17}} = L_{17} + G_{17}$ which results from $G_i$, $L_i$ and $E_i$ being mutually exclusive with one and only one true. Because A and B cannot both be true the formula can therefore be reduced to:

$$\text{INSIDE} = [\overline{E_{17}} + G_{18} + \ldots + G_{26} + B] \cdot [E_{17} + L_{18}] \cdot$$
$$[E_{18} + L_{19}] \cdot \ldots \cdot [E_{25} + L_{26}] \cdot [E_{26} + A]$$

where:

$$A = [(ODR_{27-28}) \text{ minus } (ICR_{27-28} \text{ plus RANGE SIZE}) < -4]$$

$$B = [(ICR_{27-28}) \leq (ODR_{27-28}) < ICR_{27-28} \text{ plus RANGE SIZE}]$$

Since: $\overline{E_{17}} = G_{17} + L_{17}$

The complement equation is:

$$\overline{\text{INSIDE}} = E_{17} \cdot \overline{G_{18}} \cdot \ldots \cdot \overline{G_{16}} \cdot \overline{B} +$$
$$\overline{E_{17} \cdot L_{18}} + \overline{E_{18} \cdot L_{19}} + \ldots + \overline{E_{25} \cdot L_{26}} + \overline{E_{26}} \cdot \overline{A}$$

This can be simplified to $$\overline{\text{INSIDE}} = X \cdot \overline{B} + Y + Z \cdot \overline{A} \text{ where}$$
$$X = E_{17} \cdot \overline{G_{18}} \cdot \ldots \cdot \overline{G_{26}}$$
$$Y = \overline{E_{17}} \cdot \overline{L_{18}} + \overline{E_{18}} \cdot \overline{L_{19}} + \ldots + \overline{E_{25}} \cdot \overline{L_{26}}$$
$$Z = \overline{E_{26}}$$

The logic expressions for A and B are derived in FIG. 2 as follows:

$ODR_{27}$ and $ODR_{28}$ are assigned positive weights (2 and 1, respectively), while $ICR_{27}$ and $ICR_{28}$ are assigned negative weights ($-2$ and $-1$, respectively) for handling the subtraction of ICR from ODR. This means when the bit is on (true) it has a value equal to its weight. When it is off it has a value of 0. Therefore, the three unique conditions, G, E, L, for position 27 have value of $+2, 0,$ and $-2$, respectively, while those for position 28 have values $+1, 0, -1$. For example, since $G_{27}$ is on when ODR is on (value of $+2$) and $ICR_{27}$ is off (value of 0) $G_{27}$ has a combined value of $+2$. The RANGE SIZE is also assigned a negative weight, $-1$ through $-4$, where relevant to handle its subtraction from ODR. The combined values of ODR, ICR, and RANGE SIZE are shown in subtable 1. The expression will be true if the combined value is less than $-4$, as shown in subtable 2 from which the logic equation for A is derived.

The expression B consists of the AND of two inequalities, labeled B1 and B2. B1 is independent of RANGE SIZE. Therefore, subtable 3 shows the combined values with RANGE SIZE excluded. Subtable 4 shows the entries for which B1 is true, subtable 5 shows the entries for which B2 is true, using the values of subtable 1 in which RANGE SIZE is included. The AND of B1 and B2 are combined in subtable 6, showing the entries for which both B1 and B2 are true and representing the condition for which B is true. The equation for B is derived from this subtable.

FIG. 3 shows an implementation of signal INSIDE where the rectangles 10 are NAND gates and the circles 12 are OR gates and the dots 14 at the outputs of the NAND gates perform AND functions. A first logic means 20 is provided which is responsive to both the K-g high order digits ($ODR_{17}$ to $ODR_{26}$) of the memory address being tested where g is a number of digits equal to or greater than the digits ($C_0C_1$) that indicate the number of addresses in the range of contiguous addresses. The first logic means 20 is also responsive to the corresponding K-g high order digits ($ICR_{17}$ to $ICR_{26}$) of the first address in the range of addresses to test for the existence of the conditions of the K-g high order digits set forth in FIG. 1 of the drawings and included in case 1, case 2 and case 3. The outputs of the first logic means 20 are marked X, Y and Z in FIG. 3.

A second logic means 22 is also provided, this second logic means is responsive to the low order digits ($ODR_{27}$ and $ODR_{28}$) of the memory address being tested and to the corresponding digits ($ICR_{27}$ and $ICR_{28}$) if the first address in the range. This second logic means is also responsive to the digits $C_0$, $C_1$ to test for the conditions A and B set forth in FIG. 2 of the drawings. The output signals of $\overline{A}$ and e,ovs/B/ are indicative of the results of this testing.

Finally, there is a third logic means 24 which is responsive to the signals X, Y and Z and $\overline{A}$ and $\overline{B}$ from the first and second means to test for a third condition $X \cdot Y \cdot A + B \cdot Y \cdot Z$ to determine conclusively if the memory address is within the range.

One embodiment of the present invention has been described. Obviously a number of changes can be made in this embodiment without departing from the spirit and scope of the invention.

Having thus described our invention, what we claim as new, and desire to secure by Letters Patent is:

1. A circuit for checking to see if a memory address made up of a group of M high order digits plus a group of K low order digits can fall within a range of contiguous memory addresses comprising:

first means for receiving the low order K-digits of an address at one end of said range of contiguous addresses, second means for receiving c-digits that indicate the number of addresses in said range of contiguous addresses, first logic means responsive both to the K-g high order digits of said K low order digits received in said first means where g is a number of digits less than K digits and equal to or greater than c digits and to the correspondingly ordered K-g high order digits of said lower order digits in the memory address being checked to test for the existence of conditions of the K-g digits which would indicate the memory address can fall within said range and in response to the test provide a first set of signals indicative of the results of the test, second logic means responsive both to said low-order g digits of said K low order digits received in said first means, and to the correspondingly ordered g low order digits of the memory address being checked and also responsive to said c digits received by said second means for testing the occurrence of a particular one of a plurality of further conditions of the g digits which would indicate that the memory address can fall within the range and provide a second set of signals indicative to the results of the testing, and third logic means responsive to the first and second set of signals from said first and second logic means respectively to determine concurrence of one of the plurality of further conditions with one of the first mentioned conditions and thereby indicate whether said memory address does fall in said range.

2. The apparatus of claim 1 in which said first means specifies the address at the low end of the range of contiguous addresses.

3. The apparatus of claim 2 in which said memory address is $$ODR = ODR_1 \ldots, ODR_{(M+K)}$$

said end of the range of contiguous addresses is:

$$ICR = ICR_1 \ldots, ICR_{(M+K)}$$

said first, second and third logic means together solve the expression $$[\overline{E_{M+1}} + G_{M+2} + \cdots \\ + G_{M+K-g} + B] \cdot [E_{M+1} + L_{M+2}] \cdots \\ \cdot [E_{M+K-g-1} + L_{(M+K-g)}] \cdot [E_{M+K-g} + A]$$

where $$G_i = [ODR_i > ICR_i] = ODR_i \cdot \overline{ICR_i}$$
$$L_i = [ODR_i < ICR_i] = \overline{ODR_i} \cdot ICR_i$$
$$E_i = [ODR_i = ICR_i] = \overline{ODR_i} \cdot \overline{ICR_i} + ODR_i \cdot ICR_i$$

$$A = [[ODR_{(M+K-g+1)-(M+K)}] \text{ minus}$$

$$[ICR_{(M+K-g+1)-(M+K)} \text{ plus RANGE SIZE}] < -2^g]];$$

$$B = [[ICR_{(M+K-g+1)-(M+K)}] \leq [ODR_{(M+K-g+1)-(M+K)}] <$$

[ICR$_{(M+K-g+1)-(M+K)}$ plus RANGE SIZE]].

4. The apparatus of claim 1 wherein,
a first of said first mentioned conditions of said K-g digits is that each of said K-g digits received in said first means is equal to "1" when each of said K-g digits in the memory address is equal to "0",
a second of said first mentioned conditions of said K-g digits is that one digit i of the K-g digits of the memory address equals "1" while the corresponding digit i in the K-g digits received in said first means equals "0" while each higher order digit of said K-g digits in said memory address is equal to its corresponding digit of the K-g digits received in said first means and all lower order digits in said K-g digits of the memory address equal "0" and lower order of said K-g digits received in said first means equals "1",
a third of said first mentioned conditions of the K-g digits is that each of the digits in the memory address is equal to the corresponding digit in the K-g digits received by said first means,
a first of the further conditions equals [(ODR$_{(M+K-g+1)-(M+K)}$) minus (ICR$_{(M+K-g+1)-(M+K)}$ plus RANGE SIZE)<$-2^g$]
a second of the further conditions equals [(ICR$_{(M+K-g+1)-(M+K)}$)$\leq$(ODR$_{(M+K-g+1)}$−(M+K))<(ICR$_{(M+K-g+1)-(M+K)}$ plus RANGE SIZE)]
said first set of signals are X, Y and Z where $\overline{X} \cdot \overline{Y}$=- the OR of the first and second of the first mentioned conditions and $\overline{Z} \cdot \overline{Y}$=n the third of the first mentioned conditions
where said third logic means performs the logical function $\overline{X} \cdot \overline{Y} \cdot A + B \cdot \overline{Y} \cdot \overline{Z}$ to determine if the memory address can be within said range.

* * * * *